United States Patent
Ukon et al.

(10) Patent No.: US 11,831,524 B2
(45) Date of Patent: Nov. 28, 2023

(54) NETWORK MONITORING DEVICE AND CONNECTION COUNTING METHOD

(71) Applicant: Nippon Telegraph and Telephone Corporation, Tokyo (JP)

(72) Inventors: Yuta Ukon, Tokyo (JP); Shuhei Yoshida, Tokyo (JP); Shoko Oteru, Tokyo (JP); Namiko Ikeda, Tokyo (JP); Koyo Nitta, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 17/773,807

(22) PCT Filed: Nov. 5, 2019

(86) PCT No.: PCT/JP2019/043225
§ 371 (c)(1),
(2) Date: May 2, 2022

(87) PCT Pub. No.: WO2021/090353
PCT Pub. Date: May 14, 2021

(65) Prior Publication Data
US 2022/0407788 A1     Dec. 22, 2022

(51) Int. Cl.
*H04L 43/08*     (2022.01)
*H04L 43/062*    (2022.01)
*H04L 43/10*     (2022.01)
*H04L 69/22*     (2022.01)

(52) U.S. Cl.
CPC ............ *H04L 43/062* (2013.01); *H04L 43/08* (2013.01); *H04L 43/10* (2013.01); *H04L 69/22* (2013.01)

(58) Field of Classification Search
CPC ...................................................... H04L 43/10
See application file for complete search history.

(56) References Cited

U.S. PATENT DOCUMENTS

| 5,862,335 A * | 1/1999 | Welch, Jr. ............... H04L 67/06 709/224 |
| 7,620,057 B1 * | 11/2009 | Aloni .................. G06F 12/0804 711/143 |
| 2006/0031359 A1* | 2/2006 | Clegg .................... H04L 51/212 709/206 |

OTHER PUBLICATIONS

Kerrisk, "Linux System Administrator's Manual NETSTAT(8)," May 11, 2019, Linux/UNIX system programming training, found on the Internet at http://man7.org/linux/man-pages/man8/netstat.8.html, Oct. 15, 2019, 5 pages.
McCloghrie, "SNMPv2 Management Information Base for the Transmission Control Protocol using SMIv2," Network Working Group, Request for Comments: 2012, Cisco Systems, Nov. 1996, 10 pages.

* cited by examiner

Primary Examiner — Viet D Vu
(74) Attorney, Agent, or Firm — Slater Matsil, LLP

(57) ABSTRACT

A state detection circuit compares a target connection with an immediate previous connection based on an identifier of an incoming packet and detects a post-transitional state of the target connection based on a control flag of the incoming packet and on a pre-transitional state of the target connection detected just before if the target connection is identical with the immediate previous connection; and a connection counting circuit increments or decrements the number of target connections only when the detected post-transitional state indicates a start or end of the target connection.

12 Claims, 9 Drawing Sheets

| ADDRESS | VALUE |
|---|---|
| 0 | REFERENCE VALUE A, STATE 0 |
| 1 | — |
| 2 | REFERENCE VALUE B, STATE 1 |
| ⋮ | |

NETWORK MONITORING DEVICE AND CONNECTION COUNTING METHOD

CROSS-REFERENCE TO RELATED APPLICATIONS

This application is a national phase entry of PCT Application No. PCT/JP2019/043225, filed on Nov. 5, 2019, which application is hereby incorporated herein by reference.

TECHNICAL FIELD

The present invention relates to a connection counting technique for counting the number of connections established on a communications network.

BACKGROUND

Generally, in data centers, network traffic (hereinafter referred to as "traffic") is monitored to suitably manage and operate network services. Recently, with advancements in network virtual technologies such as SDN (Software Defined Network) and NFV (Network Function Virtualization), there has been demand for software and hardware for use to monitor more diverse traffic than before.

In data centers, in which server load increases with the number of accesses, it is important in management of network services to monitor the number of accesses to servers. Because most of accesses are based on connection-oriented communications represented by TCP (Transmission Control Protocol) communications, a connection count serves as an indicator. The connection counts can be taken in the servers using, for example, a technique of Non-Patent Literature 1, which provides accurate values. In so doing, computational resources of the servers are needed in order to monitor connections.

On the other hand, network switches and routers and a network monitoring apparatus provided with a technique of Non-Patent Literature 2 can take the connection count on the communications network without placing a burden on the servers.

CITATION LIST

Non-Patent Literature

Non-Patent Literature 1: Michael Kerrisk, "Linux System Administrator's Manual NETSTAT(8)," 2019 May 11, Linux/UNIX system programming training, found on the Internet at http://man7.org/linux/man-pages/man8/netstat.8.html on Oct. 15, 2019

Non-Patent Literature 2: K. McCloghrie, "SNMPv2 Management Information Base for the Transmission Control Protocol using SMIv2," Network Working Group, Request for Comments: 2012, Cisco Systems, November 1996.

SUMMARY

Technical Problem

If connections are monitored constantly in a server using the technique described in Non-Patent Literature 1 mentioned above, the connection count can be taken accurately. However, the technique occupies some computational resources of the server, which is likely to affect the processing performance of the server. In particular, in a virtualized environment, in which traffic analysis involves heavy loads, it is considered that the processing performance of the server (virtual machine) falls more greatly than in a conventional environment.

If connections are monitored constantly using the technique described in Non-Patent Literature 2 mentioned above, states can be managed accurately from start to end by monitoring connections continuously. However, the technique requires a memory resource for use to store past states on a connection-by-connection basis as well as a computational resource for use to carry out complicated state management by selecting a target connection from stored connections. The resources increase in proportion to the number of connections to be monitored. Thus, if the number of objects to be monitored reaches or exceeds a predetermined number, it is likely that real-time monitoring will be disabled due to a lack of resources.

Embodiments of the present invention have been made to solve the above problems, and has an object to provide a connection counting technique capable of counting the number of connections in real time based on incoming packets without the need for large resources.

Means for Solving the Problem

To achieve the above object, according to embodiments of the present invention, there is provided a network monitoring apparatus comprising: a communications circuit configured to receive packets from a communications network; and a processing circuit configured to count the number of connections established on the communications network, based on incoming packets received by the communications circuit, wherein the processing circuit includes: a header analysis unit configured to acquire, from each of the incoming packets, an identifier indicating a target connection to which the incoming packet belongs and a control flag used to control state transitions of the connections, a state detection unit configured to compare the target connection with an immediate previous connection detected just prior to the target connection, based on the identifier, and detect a post-transitional state of the target connection after a state transition effected by the control flag, based on the control flag and on a pre-transitional state of the target connection detected just before if the target connection is identical with the immediate previous connection, and a connection counting unit configured to increment or decrement the number of target connections only when the detected post-transitional state indicates a start or end of the target connection.

According to embodiments of the present invention, there is provided a connection counting method used for a network monitoring apparatus that includes a communications circuit configured to receive packets from a communications network, and a processing circuit configured to count the number of connections established on the communications network, based on incoming packets received by the communications circuit, the method comprising: a header analysis step in which the processing circuit acquires, from each of the incoming packets, an identifier indicating a target connection to which the incoming packet belongs and a control flag used to control state transitions of the connections; a state detection step in which the processing circuit compares the target connection with an immediate previous connection detected just prior to the target connection, based on the identifier, and detects a post-transitional state of the target connection after a state transition effected by the control flag, based on the control flag and on a pre-transitional state of the target connection detected just before if the target connection is identical with the immediate previous connection; and a connection counting step in which the processing circuit increments or decrements the number of target connections only when the detected post-transitional state indicates a start or end of the target connection.

Effects of Embodiments of the Invention

According to embodiments of the present invention, by simply storing the immediate previous connection detected just before as well as the state of the immediate previous connection obtained as a result of the detection, the state of the target connection after control by means of a control flag can be detected. This eliminates the need to store previous states on a connection-by-connection basis. Also, since the number of target connections is incremented or decremented only when the detected state indicates a start or end of the target connection, the number of connections can be counted by an extremely simple process. This eliminates the need to carry out complicated state management on a connection-by-connection basis. This makes it possible to count the number of connections in real time based on incoming packets without the need for large resources such as memory resources and computational resources required conventionally.

DETAILED DESCRIPTION OF ILLUSTRATIVE EMBODIMENTS

Next, embodiments of the present invention will be described with reference to the drawings.

First Embodiment

Figure 1:
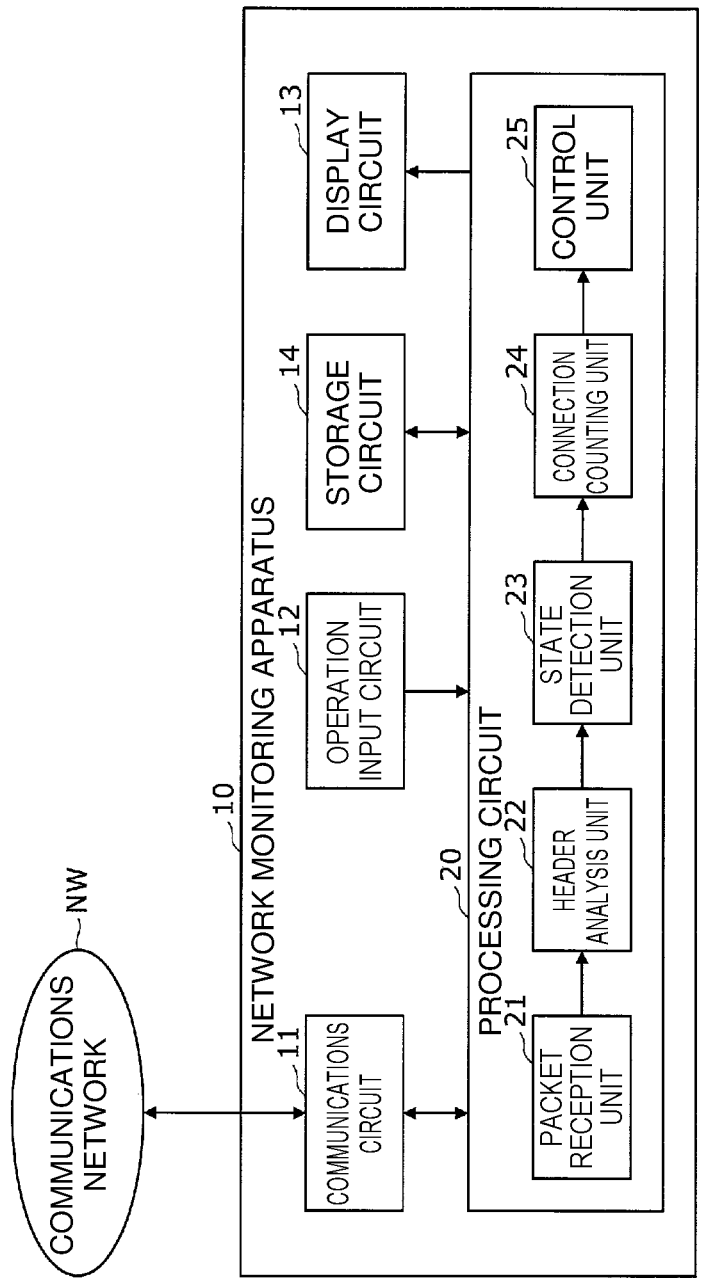
FIG. 1 is a block diagram showing a configuration of a network monitoring apparatus according to a first embodiment.

First, a network monitoring apparatus 10 according to a first embodiment of the present invention will be described with reference to FIG. 1. FIG. 1 is a block diagram showing a configuration of the network monitoring apparatus according to the first embodiment.

[Network Monitoring Apparatus]

The network monitoring apparatus 10 is made up of processing units such as servers as a whole and configured to receive and analyze packets exchanged on a communications network NW and thereby count the number of connections established on the communications network NW.

As shown in FIG. 1, the network monitoring apparatus 10 includes a communications circuit 11, an operation input circuit 12, a display circuit 13, a storage circuit 14, and a processing circuit 20 as major components.

[Communications Circuit]

The communications circuit 11 is made up of a typical communications module and provided with a function to transmit and receive packets via the communications network NW.

[Operation Input Circuit]

The operation input circuit 12 is made up of operation input devices such as a keyboard, a mouse, and a touch panel and provided with a function to detect operator operations and output the detected operator operations to the processing circuit 20.

[Display Circuit]

The display circuit 13 is made up of a screen display device and provided with a function to display, on a screen, various data including counting results on connections outputted from the processing circuit 20.

[Storage Circuit]

The storage circuit 14 is made up of storage devices such as a hard disk and a semiconductor memory and provided with a function to store processing data and programs used in various processes such as a connection counting process performed in the processing circuit 20. The programs implement processing units in collaboration with a CPU (Central Processing Unit) of the processing circuit 20, where the processing units perform various processes including a connection counting process. The programs are read from an external device or a recording medium and saved in the storage circuit 14 beforehand.

[Processing Circuit]

The processing circuit 20, which includes the CPU and peripheral circuitry thereof, has a function to read programs from the storage circuit 14 and execute the programs, thereby implementing the processing units that perform various processes including the connection counting process. The processing circuit 20 implements a packet reception unit 21, a header analysis unit 22, a state detection unit 23, a connection counting unit 24, and a control unit 25 as major processing units.

[Packet Reception Unit]

The packet reception unit 21 has a function to receive packets exchanged in the communications network NW via the communications circuit 11. To monitor connections between nodes (e.g., between server and client) using the network monitoring apparatus 10, it is sufficient to receive packets copied (captured) by switches, routers, or network taps. Thus, it is not necessary to transmit a packet to the network monitoring apparatus 10 for the purpose of monitoring connections, and consequently traffic increases can be avoided.

[Header Analysis Unit]

The header analysis unit 22 has a function to analyze a packet received by the packet reception unit 21 and acquire one or more identifiers used to identify a connection for the packet, from a header portion of the packet. Examples of information used as an identifier include an MAC (Media Access Control) address, a protocol, an IP (Internet Protocol) address, and a port number. In particular, a source IP address, a destination IP address, a source port number, a destination port number, and a combination (5-tuple) of protocols are often used. In virtualized networks, identifiers such as a VLAN ID (Virtual LAN ID) or a VXLAN ID (Virtual eXtensible LAN ID) may be used.

The header analysis unit 22 has a function to acquire a control flag used to control state transitions of the connection for the packet from a header portion or payload portion of the packet received by the packet reception unit 21. For example, in TCP (Transmission Control Protocol) communications, six types of control flags made up of URG (Urgent), ACK (Acknowledgement), PSH (Push), RST (Reset), SYN (Synchronize), and FIN (Fin) are used for connection control.

[State Detection Unit]

The state detection unit 23 has the following three functions. The first is a function to compare a target connection to which an incoming packet belongs with an immediate previous connection detected just prior to the target connection, based on an identifier acquired by the header analysis unit 22, and thereby check whether the target connection is identical with the immediate previous connection. The second is a function to detect a post-transitional state of the target connection after a state transition effected by the control flag, based on the control flag and on a pre-transitional state of the target connection detected just before if the target connection is identical with the immediate previous connection. The third is a function to detect a state of the target connection after a state transition effected by the control flag, based solely on the control flag if the target connection is different from the immediate previous connection.

As described above, the state transition of the connection to which an incoming packet belongs is controlled by the control flag contained in the incoming packet. Therefore, the state detection unit 23 handles two states: one before, and the other after, the transition effected by the control flag. According to embodiments of the present invention, the state before the transition effected by the control flag is referred to as a pre-transitional state and the state after the transition effected by the control flag is referred to as a post-transitional state. A detailed configuration of the state detection unit 23 as well as details of connection state tracking and counting processes will be described later.

[Connection Counting Unit]

The connection counting unit 24 has a function to increment or decrement a target connection count and thereby count the number of target connections if a detection result on the post-transitional state detected by the state detection unit 23 indicates a start or end of the target connection, and also has a function to output a counting result thus obtained to the control unit 25. In so doing, the connection counting unit 24 may output only the connection count of the target connection to which the incoming packet belongs, as a counting result together with the identifier indicating the target connection. Besides, when the connection count is stored on a connection-by-connection basis, if the connection count of any connection is updated, connection counts of all the connections may be outputted in batches as counting results.

[Control Unit]

The control unit 25 has a function to output counting results on connections obtained by the connection counting unit 24 to the display circuit 13 as well as to an external device (not shown) from the communications circuit 11 via the communications network NW. The control unit 25 also has a function to perform traffic control over packets based on the counting results.

[System Implementation]

Although the present embodiment has been described by taking as an example a case in which all the processing units of the processing circuit 20 are implemented by the programs running in collaboration with the CPU, this is not restrictive. For example, some or all of these processing units may be implemented by a signal processing circuit. In particular, a configuration made up of a combination of a typical server and an FPGA (Field-Programmable Gate Array) accelerator is capable of performing packet processing at high speed by using the FPGA accelerator, and thus is effective in traffic monitoring on a high-speed network such as a 40-Gbps (Gigabits per second) or 100-Gbps network. On the other hand, a low-speed network, which does not require high-speed packet processing, may use a simple-server configuration on which all processes are implemented by software. Individual circuit units may be implemented together in a single device such as a server or implemented in a distributed manner on plural devices capable of conducting data communications with one another.

[Detailed Configuration of State Detection Unit]

Figure 2:
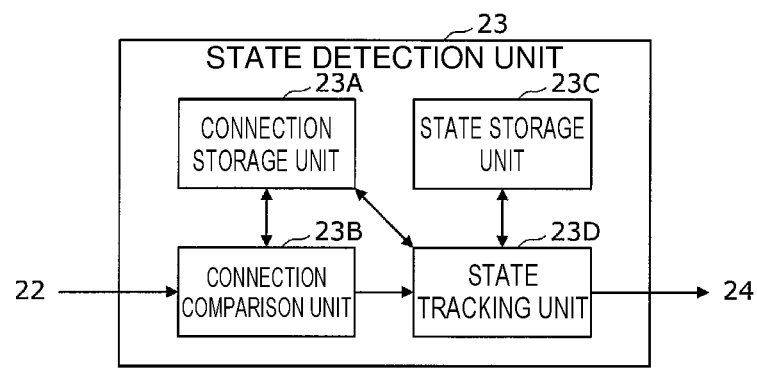
FIG. 2 is a block diagram showing a configuration of a state detection unit according to the first embodiment.

Next, a detailed configuration of the state detection unit 23 according to the present embodiment will be described with reference to FIG. 2. FIG. 2 is a block diagram showing a configuration of the state detection unit according to a first embodiment.

As shown in FIG. 2, the state detection unit 23 includes a connection storage unit 23A, a connection comparison unit 23B, a state storage unit 23C, and a state tracking unit 23D as major components.

[Connection Storage Unit]

The connection storage unit 23A has a function to store, as a target connection, the identifier acquired by the header analysis unit 22. In detecting a post-transitional state of the target connection to which the new incoming packet belongs, the connection (identifier) stored in the connection storage unit 23A is used as an immediate previous connection (identifier) detected just prior to the target connection. The connection storage unit 23A may be made up of a storage circuit such as a semiconductor memory or registers in the processing circuit 20. An internal memory of the CPU or the storage circuit 14 connected externally to the processing circuit 20 may be used as the connection storage unit 23A.

[Connection Comparison Unit]

The connection comparison unit 23B has the following two functions. The first is a function to identify the target connection to which the incoming packet belongs, based on an identifier of the target connection, the identifier having been acquired by the header analysis unit 22. The second is a function to compare the target connection (identifier) with the immediate previous connection (identifier) detected just prior to the target connection and stored in the connection storage unit 23A and thereby check whether the target connection is identical with the immediate previous connection.

[State Storage Unit]

The state storage unit 23C has a function to store the state of the target connection detected by the state tracking unit 23D. In detecting a post-transitional state of the target connection to which the new incoming packet belongs, the state of the connection stored in the state storage unit 23C is used as the pre-transitional state of the target connection detected just before. The state storage unit 23C may be made up of a storage circuit such as a semiconductor memory or registers in the processing circuit 20, or an internal memory of the CPU or the storage circuit 14 connected externally to the processing circuit 20 may be used.

[State Tracking Unit]

The state tracking unit 23D has the following three functions. The first is a function to track the state transition of the target connection and detect a post-transitional state of the target connection after a state transition effected by the control flag, based on the control flag acquired by the header analysis unit 22 as well as on the state of the immediate previous connection stored in the state storage unit 23C, i.e., on the pre-transitional state of the target connection if a determination result produced by the connection comparison unit 23B indicates that the target connection is identical with the immediate previous connection. The second is a function to track the state transition of the target connection and detect a post-transitional state of the target connection after a state transition effected by the control flag, based solely on the control flag acquired by the header analysis unit 22 if the target connection is different from the immediate previous connection. The third is a function to update the connection (identifier) stored in the connection storage unit 23A and the state of the connection stored in the state storage unit 23C based on the determination result produced by the connection comparison unit 23B and on the detected post-transitional state.

[Details of State Tracking and Counting Processes]

Figure 3:
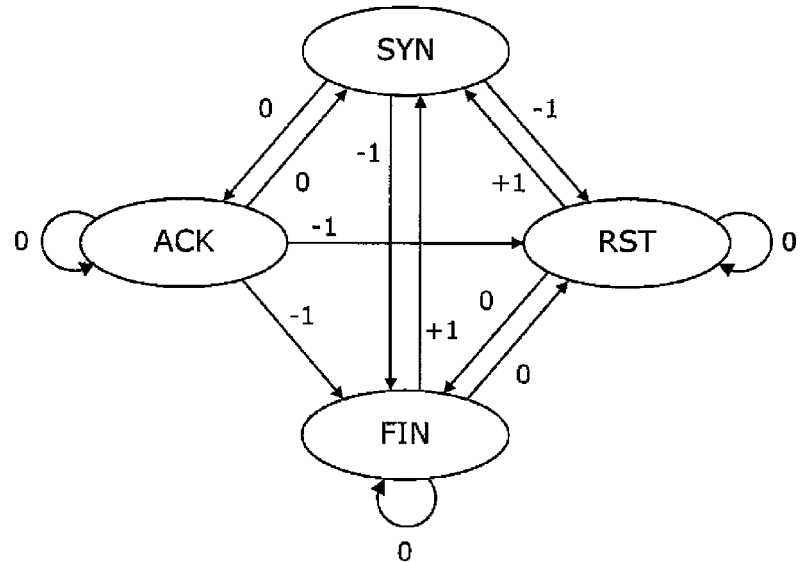
FIG. 3 is a state transition diagram showing states of a TCP connection.

Next, details of a state tracking process performed by the state tracking unit 23D will be described with reference to FIG. 3. FIG. 3 is a state transition diagram showing states of a TCP connection.

The state tracking unit 23D performs the state tracking process based on the state transition diagram of FIG. 3. Description will be given below by taking as an example a case in which the connection subjected to the state tracking process is a TCP connection. Note that the state tracking process based on the illustrated state transition diagram is also applicable to a connection based on a protocol other than the TCP.

The control flag in a TCP header is 6 bits long and each bit is assigned a meaning indicating a state of a connection. Of the six flag types, an SYN (Synchronize) flag means that establishment of a connection is requested, and an FIN (Fin) flag means that normal termination of the connection is requested. An RST (Reset) flag means that the connection will be broken forcefully and an ACK (Acknowledgement) flag means that an acknowledgement number field is enabled.

Because the TCP connection is provided with retransmission control, an SYN flag, an FIN flag, and an RST flag may be detected in succession. Therefore, it is necessary to detect a start or end of the connection by tracking state transitions of the connection based on the order of detected control flags. The state tracking unit 23D manages the state of the connection based on the state transition diagram of FIG. 3 and hereby detects the state of the connection after a state transition effected by the control flag, i.e., a post-transitional state. The connection counting unit 24 increments or decrements the connection count based on the post-transitional state.

Specifically, for example, if a transition from an SYN state or an ACK state to an FIN state or an RST state occurs, the state tracking unit 23D detects an end of the connection and the connection counting unit 24 decrements the connection count by 1 (−1). On the other hand, when a transition from an FIN state or an RST state to an SYN state occurs, the state tracking unit 23D detects a start of the connection and the connection counting unit 24 increments the connection count by 1 (+1). In the case of any other transition, the connection counting unit 24 does not increment or decrement the connection count (0). By managing the state of the connection in this way, it is possible to do correct detection and correct counting even if the same type of control flag is detected in succession.

[Example of Connection Counting]

Figure 4:
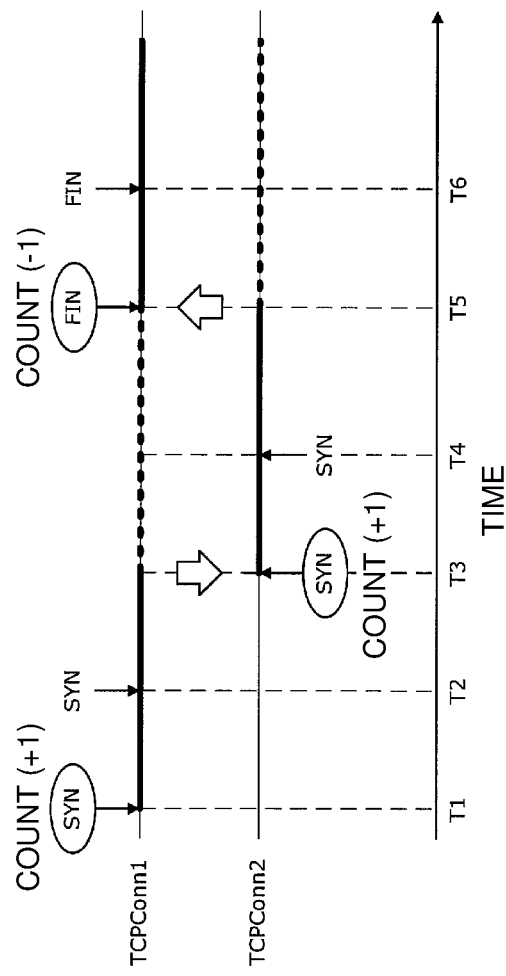
FIG. 4 is an explanatory diagram showing an example of counting the number of connections according to the first embodiment.

Next, an example of connection counting will be described with reference to FIG. 4. FIG. 4 is an explanatory diagram showing an example of counting the number of connections according to the first embodiment.

In the example of FIG. 4, first at time T1, if an SYN flag of a TCP connection 1 (TCPConn1) is detected in an FIN state or an RST state, a start of the connection is detected and the connection count is incremented (+1).

Next, even if the SYN flag of TCP connection 1 continues to be detected at time T2, a start of the connection is not detected in the state management by means of the state transition diagram of FIG. 3 and the connection count is neither incremented nor decremented (o).

Subsequently, at time T3, if the SYN flag of a different TCP connection (TCPConn2) is detected during management of TCP connection 1, the TCP connection count is incremented (+1) with the detection of the SYN flag without detecting the state of the connection using the state transition diagram of FIG. 3. In so doing, the connection to be managed is changed from TCP connection 1 to TCP connection 2. Consequently, even if the SYN flag of TCP connection 2 continues to be detected at time T4 next, the state of the connection is detected correctly as with the above example, a start of the connection is not detected, and the connection count is not incremented.

Subsequently, at time T5, if the FIN flag of TCP connection 1 is detected, an end of the connection is detected through operation similar to the one described above and the TCP connection count is decremented (−1). In so doing, because the TCP connection under management returns to TCP connection 1, even if an FIN flag is detected at time T6 next, the connection count is not decremented.

In FIG. 4, the solid lines represent sections in which the TCP connections are managed using the state transition diagram and the broken lines represent sections in which the TCP connections are not managed. In the broken-line sections, in which the states of the TCP connections are not managed, the states of the TCP connections are unknown, but data transfer is going on in these sections and the sections are irrelevant to the increases and decreases in the TCP connection count. Therefore, when a start or end of a new TCP connection is detected, even if the connection under management is switched from the previous TCP connection to the new TCP connection, the connection counting process is not affected in any way. The above operation makes it possible to appropriately increment or decrement the TCP connection counts without changing the number of TCP connections to be managed.

[Operation of First Embodiment]

Figure 5:
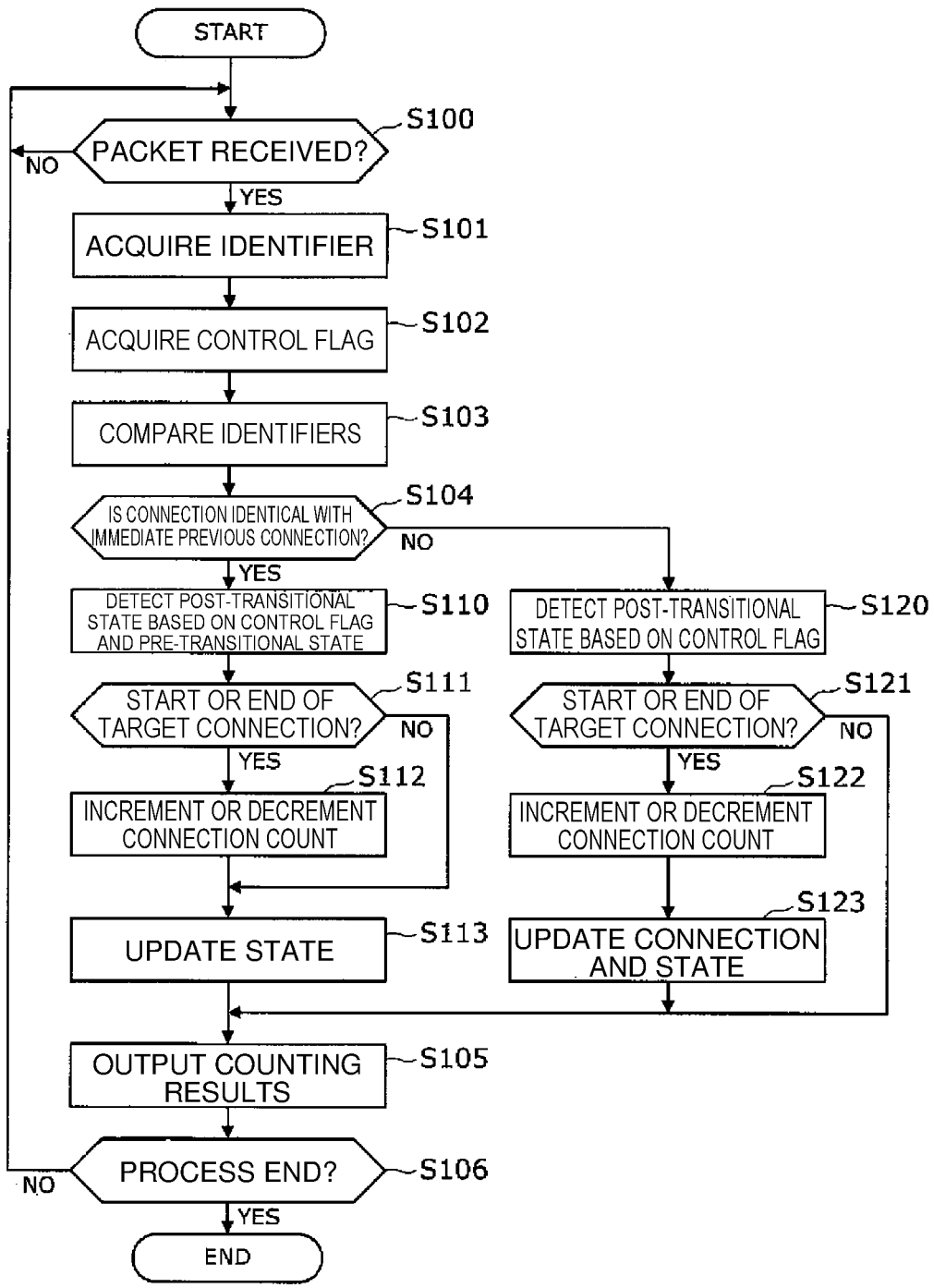
FIG. 5 is a flowchart of a connection counting method for the network monitoring apparatus according to the first embodiment.

Next, operation of the network monitoring apparatus 10 according to the present embodiment will be described with reference to FIG. 5. FIG. 5 is a flowchart of a connection counting method for the network monitoring apparatus according to the first embodiment.

The packet reception unit 21 constantly checks whether a packet is received from the communications network NW via the communications circuit 11 (step S100), and waits until a packet is received (NO in step S100). When a packet is received (YES in step S100), the packet reception unit 21 outputs the incoming packet to the header analysis unit 22.

The header analysis unit 22 analyzes the incoming packet outputted from the packet reception unit 21, acquires an identifier from the header portion of the incoming packet (step S101), and acquires the control flag from a header portion or payload portion of the incoming packet (step S102).

Next, in the state detection unit 23, the connection comparison unit 23B compares the identifier of the target connection acquired by the header analysis unit 22 with the identifier of the immediate previous connection stored in the connection storage unit 23A (step S103) and determines whether the target connection is identical with the immediate previous connection (step S104).

If it is determined by the connection comparison unit 23B that the target connection is identical with the immediate previous connection (YES in step S104), based on the pre-transitional state of the target connection stored in the state storage unit 23C and on the control flag acquired by the header analysis unit 22, the state tracking unit 23D tracks the state transitions of the target connection and thereby detects a post-transitional state (step S110).

Next, the state tracking unit 23D checks whether the detected post-transitional state is a start or end of the target connection (step S111). Then, if the detected post-transitional state is a start or end of the target connection (YES in step S111), the connection counting unit 24 increments or decrements the target connection count (step S112). The state tracking unit 23D updates and overwrites the state stored in the state storage unit 23C with the detected post-transitional state (step S113) and goes to step S105 described later.

Note that in step S111, if the detected post-transitional state is not a start or end of the target connection (NO in step S111), the operation of the apparatus goes to step S113 by skipping step S112. Then, the state tracking unit 23D updates and overwrites the state stored in the state storage unit 23C with the detected post-transitional state (step S113). Then, the operation of the apparatus goes to step S105 described later.

On the other hand, in step S104, if it is determined by the connection comparison unit 23B that the target connection is different from the immediate previous connection (NO in step S104), based on the control flag acquired by the header analysis unit 22, the state tracking unit 23D tracks the state transitions of the target connection and thereby detects a post-transitional state (step S120).

Next, the state tracking unit 23D checks whether the detected post-transitional state is a start or end of the connection (step S121). Then, if the detected post-transitional state is a start or end of the connection (YES in step S121), the connection counting unit 24 increments or decrements the number of target connections (step S122). The state tracking unit 23D updates and overwrites the identifier of the connection stored in the connection storage unit 23A with the identifier of the target connection, updates and overwrites the state stored in the state storage unit 23C with the detected post-transitional state (step S123), and goes to step S105 described later.

Note that in step S121, if the detected post-transitional state is not a start or end of the target connection (NO in step S121), the operation of the apparatus goes to step S105 described later, by skipping steps S122 and S123.

Next, in step S105, the connection counting unit 24 outputs the obtained connection counts as counting results to the control unit 25 (step S105). Consequently, the counting results on connections are outputted from the control unit 25 to the display circuit 13 and displayed on a screen as status of use of the communications network NW. The counting results may also be used for traffic control of the control unit 25.

Subsequently, a check is made for a process end command based on operator input, for example, detected by the operation input circuit 12 (step S106). If there is no process end command (NO in step S106), the flow returns to step S100 to continue processing. On the other hand, if there is a process end command (YES in step S106), the series of connection counting processes is finished.

[Effects of First Embodiment]

In this way, according to the present embodiment, in the case described below, the state detection unit 23 detects a post-transitional state of the target connection after a state transition effected by the control flag, based on the control flag acquired from the incoming packet and on the pre-transitional state of the target connection detected just before. Then, only when the detected post-transitional state indicates a start or end of the target connection, the connection counting unit 24 increments or decrements the number of target connections. The case mentioned above is a case in which when the state detection unit 23 identifies the target connection to which the incoming packet belongs, based on the identifier acquired from the incoming packet, and compares the target connection with the immediate previous connection detected just prior to the target connection, the target connection is identical with the immediate previous connection.

When the target connection is different from the immediate previous connection, the state detection unit 23 detects a post-transitional state of the target connection after a state transition effected by the control flag, based solely on the control flag.

Consequently, by simply storing the immediate previous connection detected just before as well as the state of the immediate previous connection obtained as a result of the detection, the state detection unit 23 can detect the state of the target connection after control by means of a control flag. This eliminates the need to store previous states on a connection-by-connection basis. Also, since the number of target connections is incremented or decremented only when the detected state indicates a start or end of the target connection, the connection counting unit 24 can count the number of connections by an extremely simple process. This eliminates the need to carry out complicated state management on a connection-by-connection basis. This makes it possible to count the number of connections in real time based on incoming packets without the need for large resources such as memory resources and computational resources required conventionally.

According to the present embodiment, in detecting the state of the target connection to which the new incoming packet belongs, the state detection unit 23 may use the connection stored in the connection storage unit 23A directly as the immediate previous connection, and the state of the connection stored in the state storage unit 23C directly as the state of the immediate previous connection.

This makes it possible to implement connection counting based on incoming packets using extremely simple memory resources.

Second Embodiment

Figure 6:
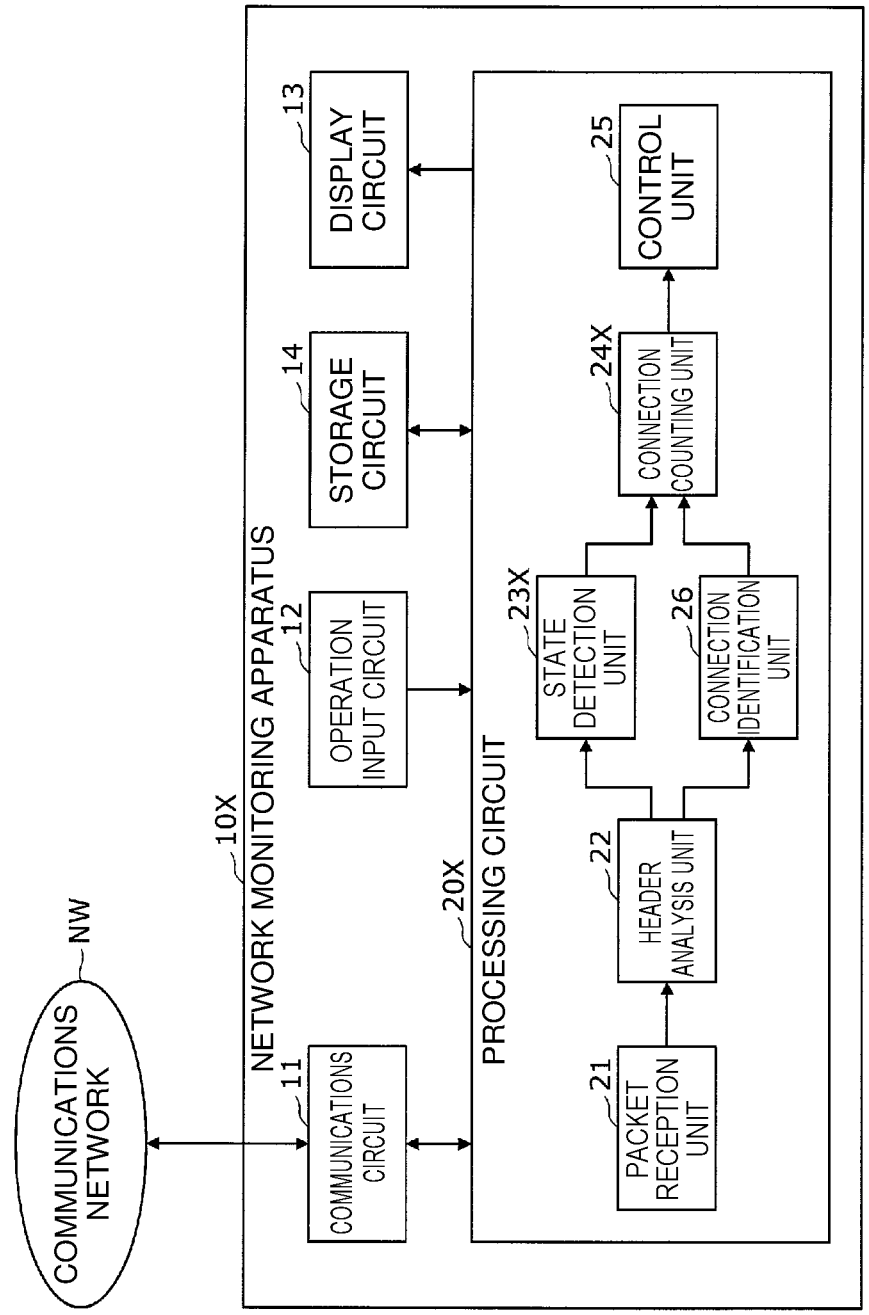
FIG. 6 is a block diagram showing a configuration of a network monitoring apparatus according to a second embodiment.

Next, a network monitoring apparatus 10X according to a second embodiment of the present invention will be described with reference to FIG. 6. FIG. 6 is a block diagram showing a configuration of the network monitoring apparatus according to a second embodiment.

As shown in FIG. 6, the network monitoring apparatus 10X according to the present embodiment includes a communications circuit 11, an operation input circuit 12, a display circuit 13, a storage circuit 14, and a processing circuit 20X as major components. Of these components, the communications circuit 11, the operation input circuit 12, the display circuit 13, and the storage circuit 14 are similar to those of the first embodiment, and thus description thereof will be omitted here.

As with the processing circuit 20 of FIG. 1, the processing circuit 20X includes the CPU and peripheral circuitry thereof, and has a function to read programs from the storage circuit 14 and execute the programs, thereby implementing the processing units that perform various processes including the connection counting process. The processing circuit 20X implements a packet reception unit 21, a header analysis unit 22, a state detection unit 23X, a connection counting unit 24X, a control unit 25, and a connection identification unit 26 as major processing units. Of these components, the packet reception unit 21, the header analysis unit 22, and the control unit 25 are similar to those of the first embodiment, and thus description thereof will be omitted here.

As shown in FIG. 6, the network monitoring apparatus 10X according to the present embodiment differs from FIG. 1 in that the connection identification unit 26 has been added to the processing circuit 20X. In the present embodiment, description will be given of a case in which the connection identification unit 26 identifies the target connection to which each incoming packet belongs using a rule matching technique, and the connection counting unit 24X counts the number of target connections identified by the connection identification unit 26, based on the post-transitional state of each of the target connections obtained by the state detection unit 23X.

That is, in the present embodiment, the connection identification unit 26 has a function to prepare rules made up of part or all of an identifier used to identify a connection to be monitored, and identify a rule that matches the identifier as the target connection.

The connection counting unit 24X has a function to increment or decrement the connection count for the target connection identified by the connection identification unit 26 only when the detected post-transitional state indicates a start or end of the target connection.

In the present embodiment, description will also be given of a case in which it is determined whether a target connection and the immediate previous connection are identical or different and the pre-transitional state of the target connection is acquired. Here, the determination is made with reference to a state table using a hash value calculated from the identifier of the incoming packet, where the state table is provided in the state detection unit 23X and stores a reference value and a state of each monitored connection at the address corresponding to the connection.

That is, in the present embodiment, the state detection unit 23X has the following three functions. The first is a function to maintain a state table that stores a reference value and a state of each monitored connection at the address corresponding to the connection, calculate a hash value from the identifier and divide the hash value into a first hash value and a second hash value, and acquire the reference value and the state as the address corresponding to the first hash value from the state table. The second is a function to determine that the target connection is identical with the immediate previous connection and use the acquired state as the pre-transitional state of the target connection if the second hash value matches the acquired reference value. The third is a function to determine that the target connection is different from the immediate previous connection if the second hash value does not match the acquired reference value.

Whereas an example in which the connection identification unit 26, the connection counting unit 24X, and the state detection unit 23X are used in combination will be described in the present embodiment, this is not restrictive. The connection identification unit 26 and the connection counting unit 24X operate in conjunction with each other, but the state detection unit 23X does not operate in conjunction with the connection identification unit 26 and the connection counting unit 24X. Therefore, the state detection unit 23X may be applied separately to the network monitoring apparatus 10 according to the first embodiment shown in FIG. 1.

[Connection Identification Unit]

The connection identification unit 26 compares rules (combinations of identifiers) registered in advance to the identifiers acquired by the header analysis unit 22, identifies a rule that matches the identifier as the target connection, and outputs the rules to the connection counting unit 24X (exact-match search). As a method for comparing the rules to the identifiers, any of common well-known techniques such as linear searches, tree searches, and hash methods are available for use. Besides, the use of TCAM (Ternary Content Addressable Memory), which is a special memory, makes it possible to carry out a rule search with any desired identifier masked (partial-match search).

[Example of Connection Counting]

Figure 7:
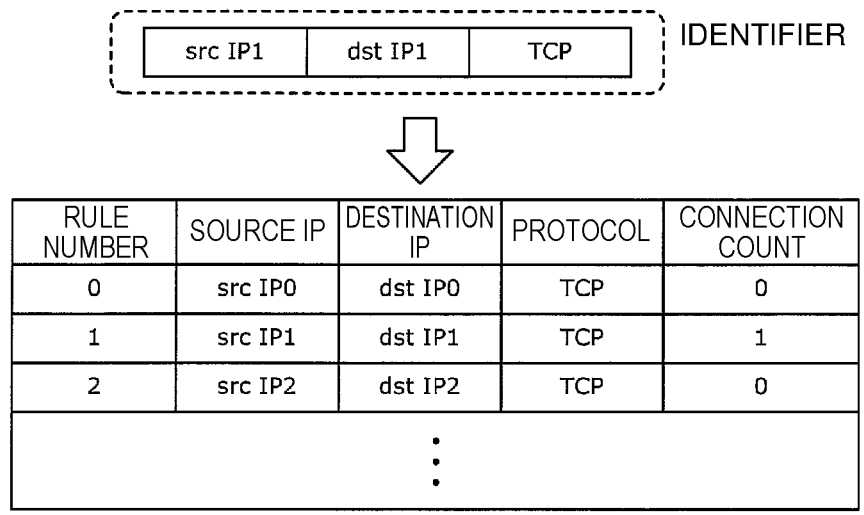
FIG. 7 is an explanatory diagram showing an example of counting the number of connections according to the second embodiment.

Next, an example of connection counting will be described with reference to FIG. 7. FIG. 7 is an explanatory diagram showing an example of counting the number of connections according to the second embodiment.

FIG. 7 shows a case in which an identifier is made up of a combination of a source IP address of an incoming packet, a destination IP address, and a protocol. It is assumed that a rule group has been registered beforehand in the connection identification unit 26 as rules for use to identify connections.

As shown in FIG. 7, a rule number is registered with each rule to identify the rule. Besides, as in the case of identifiers, a combination of a source IP address, a destination IP address, and a protocol are registered with the rule. For example, source IP address "src IP1," destination IP address "dst IP1," and protocol "TCP" are registered with the rule with a rule number of "0." Therefore, if the identifier acquired from an incoming packet is made up of a combination of "src IP1," "dst IP1," and "TCP," the rule with a rule number of "0" that matches the identifier is selected from the rule group and the connection is identified as a target connection by the rule (rule number).

[Detailed Configuration of Connection Counting Unit]

Figure 8:
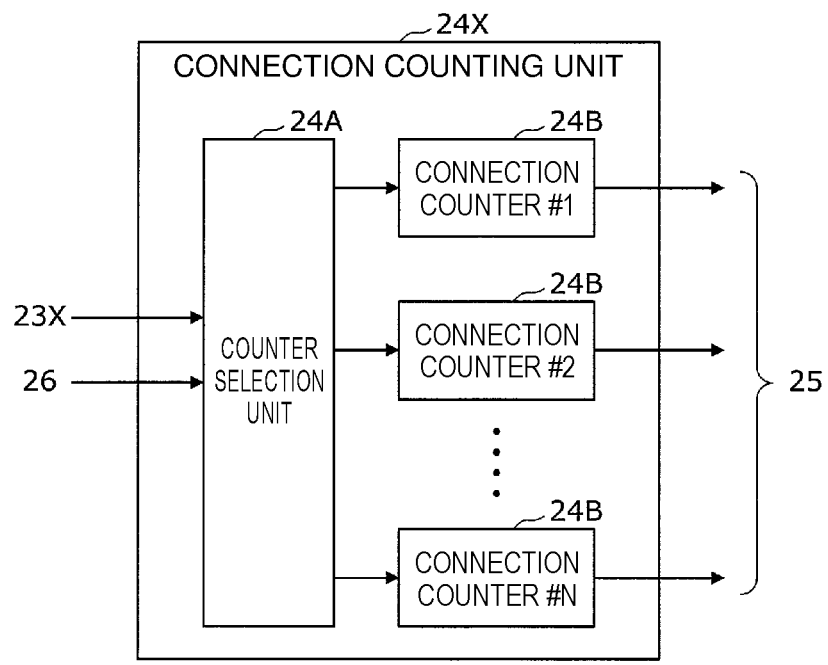
FIG. 8 is a block diagram showing a configuration of a connection counting unit according to the second embodiment.

Next, a detailed configuration of the connection counting unit 24X according to the present embodiment will be described with reference to FIG. 8. FIG. 8 is a block diagram showing a configuration of a connection counting unit according to the second embodiment.

As shown in FIG. 8, the connection counting unit 24X according to the present embodiment includes a counter selection unit 24A and N connection counters 24B (#1, #2, . . . , #N) as major components (where N is an integer of 1 or greater).

The counter selection unit 24A has the following three functions. The first is a function to select the connection counter 24B corresponding to the target connection based on the rule identified by the connection identification unit 26. The second is a function to determine whether it is necessary to increment or decrement the selected connection counter 24B based on the post-transitional state of the target connection obtained by the state detection unit 23X. The third is a function to determine that it is necessary to increment or decrement the connection count only when the post-transitional state indicates a start or end of the target connection and instruct the selected connection counter 24B to increment or decrement the connection count.

The connection counter 24B is provided for each connection to be monitored and provided with a function to increment or decrement the corresponding connection count on instructions from the counter selection unit 24A.

In this way, by being provided with the connection identification unit 26 and the connection counting unit 24X, the network monitoring apparatus 10X can take connection counts in parallel on a rule-by-rule basis, thereby making it possible to take connection counts on a server-by-server basis by registering identifiers for use to identify servers as rules.

Figure 9:
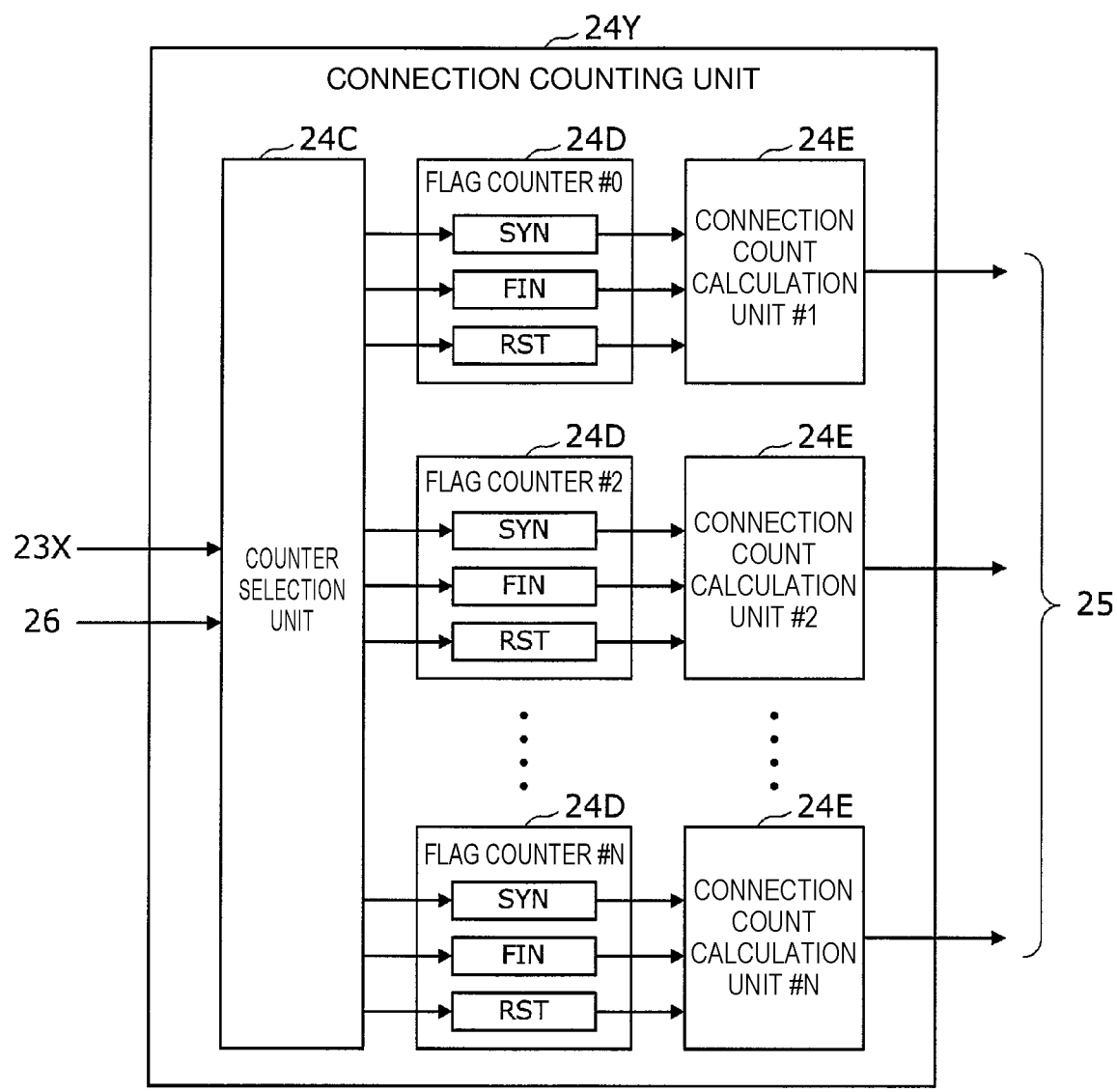
FIG. 9 is a block diagram showing another configuration of a connection counting unit according to the second embodiment.

The connection counting unit 24X may be implemented by another component such as a connection counting unit 24Y shown in FIG. 9. FIG. 9 is a block diagram showing another configuration of a connection counting unit according to the second embodiment.

The number of connections may be counted not only by a technique for computing by incrementing or decrementing depending on the start or end of each connection, but also by computing counting results obtained by counting control flags by flag type. The configuration example of FIG. 9 is a result of configuring the connection counting unit 24X using such a technique.

In FIG. 9, the connection counting unit 24Y includes a counter selection unit 24C, N flag counters 24D (#1, #2, . . . , #N), and N connection count calculation units 24E (#1, #2, . . . , #N) as major components (where N is an integer of 1 or greater).

The counter selection unit 24C has the following three functions. The first is a function to select the flag counter 24D corresponding to the target connection based on the rule identified by the connection identification unit 26. The second is a function to determine whether it is necessary to do counting by flag type on the selected flag counter 24D based on the post-transitional state of the target connection obtained by the state detection unit 23X. The third is a function to determine that counting by flag type is necessary, only when a start or end of the target connection is indicated, and instruct the selected flag counter 24D to count by flag type.

The flag counter 24D is provided for each connection to be monitored and provided with a function to count the corresponding connection separately on a flag-by-flag basis on instructions from the counter selection unit 24C. In the example of FIG. 9, of the control flags used for TCP connections, three types of flags SYN, FIN, and RST are counted separately.

The connection count calculation units 24E calculate the connection count based on count values taken on a type-by-type basis by the flag counters 24D. The connection count Cconn is given by the following expression, where Csyn is the count value of the SYN flag, Cfin is the count value of the FIN flag, and Crst is the count value of the RST flag.

$$Cconn = Csyn - (Cfin + Crst)$$

The connection counting unit 24Y having the configuration shown in FIG. 9 counts connections by separating the FIN flag used in the case of normal termination of connections and the RST flag used in the case of abnormal termination, and thus can accurately count the number of connections terminated normally and the number of connections terminated abnormally.

[Detailed Configuration of State Detection Unit]

Figures 10, 11:
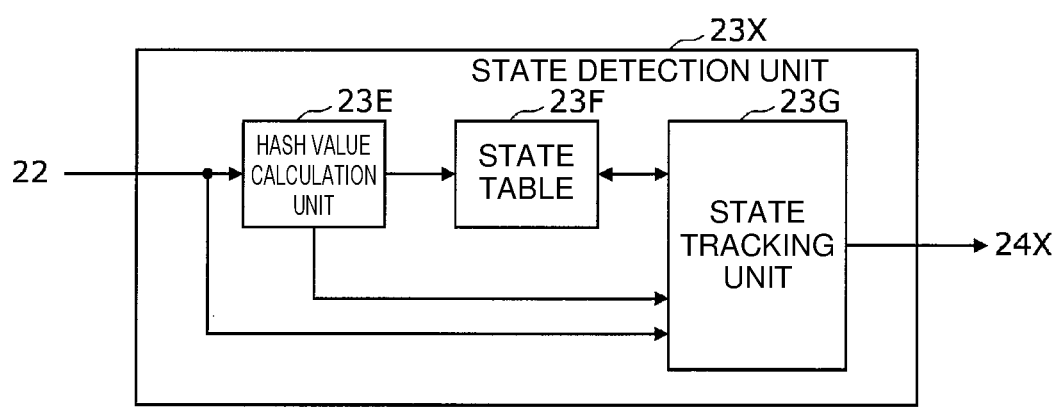
FIG. 10 is a block diagram showing a configuration of a state detection unit according to the second embodiment.
FIG. 11 is an explanatory diagram showing a configuration example of a state table.

Next, a detailed configuration of the state detection unit 23X according to the present embodiment will be described with reference to FIG. 10. FIG. 10 is a block diagram showing a configuration of the state detection unit according to the second embodiment.

As shown in FIG. 10, the state detection unit 23X according to the present embodiment includes a hash value calculation unit 23E, a state table 23F, and a state tracking unit 23G as major components.

The hash value calculation unit 23E has a function to calculate a hash value from the identifier acquired by the header analysis unit 22 and divide the resulting hash value into first and second hash values having predetermined bit counts and a function to refer to the state table 23F using the first hash value as an address. In so doing, because the first hash value is used to identify the connections to be monitored, the bit count of the first hash value can be determined according to the number of connections to be monitored.

The state table 23F has the following two functions. The first is a function to store a reference value and a state of each monitored connection as values at the address corresponding to the connection using a memory having plural addresses. The second is a function to output the reference value and state of connection stored at the corresponding address in response to an inquiry made using the first hash value from the hash value calculation unit 23E as an address. FIG. 11 is an explanatory diagram showing a configuration example of the state table. As shown in FIG. 11, for example, "reference value A" and "state 0" are stored at address "0" of the state table 23F.

The state tracking unit 23G has the following two functions. The first is a function to compare the second hash value outputted from the hash value calculation unit 23E with the reference value outputted from the state table 23F and determine whether the target connection to which the incoming packet belongs is identical with the immediate previous connection according to whether or not the second hash value matches the reference value. The second is a function to track the state transition of the target connection and detect a post-transitional state of the target connection after a state transition effected by the control flag, based on the control flag acquired by the header analysis unit 22 and on the pre-transitional state of the target connection, which is the state outputted from the state table 23F, if the determination indicates that the target connection is identical with the immediate previous connection.

The state tracking unit 23G has the following two functions. The first is a function to track the state transition of the target connection and detect a post-transitional state of the target connection after a state transition effected by the control flag, based solely on the control flag acquired by the header analysis unit 22 if the target connection is different from the immediate previous connection. The second is a function to update the state of the target connection stored in the state table 23F based on a determination result as to whether the target connection is identical with the immediate previous connection and on the detected post-transitional state. The process of tracking the state transition of the target connection performed by the state tracking unit 23G can be similar to the state tracking process performed by the state tracking unit 23D using the state transition diagram of FIG. 3 described above.

[Operation of Second Embodiment]

Figure 12:
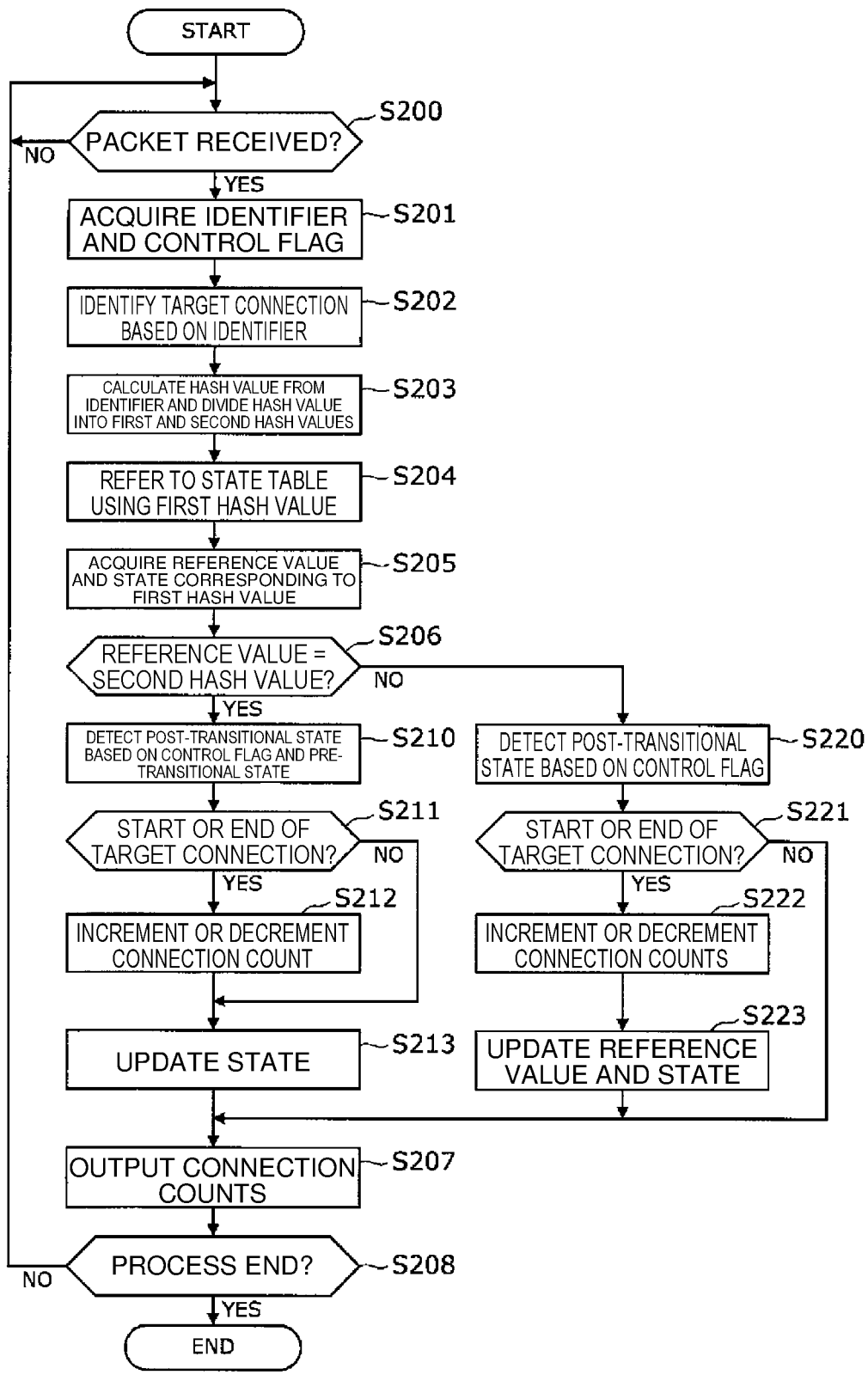
FIG. 12 is a flowchart of a connection counting method for the network monitoring apparatus according to the second embodiment.

Next, operation of the network monitoring apparatus 10X according to the present embodiment will be described with reference to FIG. 12. FIG. 12 is a flowchart of a connection counting method for the network monitoring apparatus according to the second embodiment.

The packet reception unit 21 constantly checks whether a packet is received from the communications network NW via the communications circuit 11 (step S200) and waits until a packet is received (NO in step S200). When a packet is received (YES in step S200), the packet reception unit 21 outputs the incoming packet to the header analysis unit 22.

The header analysis unit 22 analyzes the incoming packet outputted from the packet reception unit 21 and acquires an identifier and a control flag from the incoming packet (step S201).

The connection identification unit 26 compares the identifier acquired by the header analysis unit 22 with a rule registered in advance and thereby identifies the target connection to which the incoming packet belongs (step S202).

Next, in the state detection unit 23X, the hash value calculation unit 23E calculates a hash value from the identifier acquired by the header analysis unit 22, divides the resulting hash value into first and second hash values (step S203), and refers to the state table 23F using the first hash value as an address (step S204).

The state tracking unit 23G acquires a reference value and a state of the connection from the state table 23F (step S205) as a result of the reference and compares the second hash value outputted from the hash value calculation unit 23E with the reference value (step S206).

If the second hash value matches the reference value (YES in step S206), the state tracking unit 23G determines that the target connection to which the incoming packet belongs is identical with the immediate previous connection and tracks the state transitions of the target connection to thereby detect a post-transitional state of the target connection after a state transition effected by the control flag, based on the control flag acquired by the header analysis unit 22 and on the pre-transitional state of the target connection, which is the state outputted from the state table 23F (step S210).

Next, the state tracking unit 23G checks whether the detected post-transitional state is a start or end of the target connection (step S211). If the detected post-transitional state is a start or end of the target connection (YES in step S211), the connection counting unit 24X increments or decrements the number of target connections identified by the connection identification unit 26 (step S212). Then, the state tracking unit 23G updates and overwrites the state stored in the state table 23F with the detected post-transitional state (step S213), and goes to step S207 described later.

Note that in step S211, if the detected post-transitional state is not a start or end of the target connection (NO in step S211), the state tracking unit 23G goes to step S213 by skipping step S212, updates and overwrites the state stored in the state table 23F with the detected post-transitional state (step S213), and goes to step S207 described later.

On the other hand, if it is determined in step S206 that the target connection is different from the immediate previous connection (NO in step S206), based on the control flag acquired by the header analysis unit 22, the state tracking unit 23G tracks the state transitions of the target connection and thereby detects a post-transitional state (step S220).

Next, the state tracking unit 23G checks whether the detected post-transitional state is a start or end of the connection (step S221). If the detected post-transitional state is a start or end of the target connection (YES in step S221), the connection counting unit 24X increments or decrements the number of target connections identified by the connection identification unit 26 (step S222). Then, the state tracking unit 23G updates and overwrites the reference value and state stored in the state table 23F with the second hash value and the detected post-transitional state (step S223) and goes to step S207 described later.

Note that in step S221, if the detected post-transitional state is not a start or end of the target connection (NO in step S221), the flow goes to step S207 described later by skipping steps S222 and S223.

Next, in step S207, the connection counting unit 24X outputs the obtained connection counts as counting results to the control unit 25 (step S207). Consequently, the counting results on connections are outputted from the control unit 25 to the display circuit 13 and displayed on a screen as status of use of the communications network NW. The counting results may also be used for traffic control of the control unit 25.

Subsequently, a check is made for a process end command based on operator input, for example, detected by the operation input circuit 12 (step S208). If there is no process end command (NO in step S208), the flow returns to step S200 to continue processing. On the other hand, if there is a process end command (YES in step S208), the series of connection counting processes is finished.

[Effects of Second Embodiment]

In this way, according to the present embodiment, the connection identification unit 26 prepares rules made up of part or all of an identifier used to identify a connection to be monitored, and identifies those rules which match any of the identifiers of incoming packets as target connections and the connection counting unit 24X increments or decrements the connection count for the target connection identified by the connection identification unit 26 only when the post-transitional state detected by the state detection unit 23X indicates a start or end of the target connection.

This makes it possible to take connection counts in parallel on a rule-by-rule basis, thereby making it possible to take connection counts on a server-by-server basis by registering identifiers for use to identify servers as rules. Because the number of connections to be managed remains unchanged, even if the connections to be monitored increases, monitoring can be carried out using fixed resources. Therefore, in a data center built up from plural servers, connections can be monitored accurately on a server-by-server basis using reduced resources, and thus management cost required for the data center can be reduced greatly.

In the present embodiment, the connection counting unit 24X may count control flags by flag type only when the detected post-transitional state indicates a start or end of the target connection and calculate the number of target connections from the counting results produced by the counting by flag type.

This makes it possible to count connections by separating the FIN flag used in the case of normal termination of connections and the RST flag used in the case of abnormal termination and thus accurately count the number of connections terminated normally and the number of connections terminated abnormally.

With the state table 23F being provided in the state detection unit 23X to store a reference value and a state of each monitored connection at the address corresponding to the connection, the present embodiment may be configured so as to calculate a hash value from the identifier and divide the hash value into a first hash value and a second hash value, acquire the reference value and the state from the state table 23F using the first hash value as the address, determine that the target connection is identical with the immediate previous connection if the second hash value matches the acquired reference value, detect a post-transitional state of the target connection after a state transition effected by the control flag, based on the control flag and on the pre-transitional state of the target connection, which is the acquired state, but determine that the target connection is different from the immediate previous connection if the second hash value does not match the acquired reference value and detect a post-transitional state of the target connection after a state transition effected by the control flag, based on the control flag.

This makes it possible to store plural sets of a reference value and state in the state table 23F by associating each set with a connection. This means that a large number of connections can be managed in parallel. Therefore, by increasing connection counts to be managed, it is possible to reduce erroneous connection counting, which is likely to occur when a connection under management is changed, and thereby improve estimation accuracy of connection counts.

[Extension of Embodiments]

The present invention has been described above with reference to exemplary embodiments, but the present invention is not limited to these exemplary embodiments. It will be obvious to those skilled in the art that various changes may be made to the configuration and details of the present invention without departing from the scope of the present invention. The embodiments can be implemented by being combined as desired without causing contradictions.

REFERENCE SIGNS LIST 10, 10X Network monitoring apparatus
11 Communications circuit
12 Operation input circuit
13 Display circuit
14 Storage circuit
20, 20X Processing circuit
21 Packet reception unit
22 Header analysis unit
23, 23X State detection unit
23A Connection storage unit
23B Connection comparison unit
23C State storage unit
23D State tracking unit
23E Hash value calculation unit
23F State table
23G State tracking unit
24, 24X, 24Y Connection counting unit
24A Counter selection unit
24B Connection counter
24C Counter selection unit
24D Flag counter
24E Connection count calculation unit
25 Control unit
26 Connection identification unit
NW Communications network.

The invention claimed is:

1. A network monitoring apparatus comprising:
a communications circuit configured to receive incoming packets from a communications network; and
a processing circuit configured to count a number of connections established on the communications network based on the incoming packets received by the communications circuit, wherein the processing circuit includes:
a header analysis circuit configured to acquire, from each incoming packet of the incoming packets, an identifier indicating a target connection to which the incoming packet belongs and a control flag for controlling state transitions of connections corresponding to the incoming packet;
a state detection circuit configured to:
compare the target connection of a first incoming packet with an immediate previous connection of a second incoming packet that is detected by the state detection circuit immediately prior to the target connection of the first incoming packet; and
detect a post-transitional state of the target connection of the first incoming packet after a state transition effected by the control flag of the first incoming packet, wherein the immediate previous connection is detected based on the identifier of the second incoming packet, and wherein the post-transitional state of the target connection of the first incoming packet is detected based on the control flag of the first incoming packet and on a pre-transitional state of the target connection of the first incoming packet just before receiving the first incoming packet when the target connection of the first incoming packet is identical with the immediate previous connection of the second incoming packet; and
a connection counting circuit configured to increment or decrement the number of connections only when the post-transitional state of the target connection of the first incoming packet indicates a start or end of the target connection of the first incoming packet.

2. The network monitoring apparatus according to claim 1, wherein the state detection circuit is configured to detect the post-transitional state of the target connection of the first incoming packet after the state transition effected by the control flag of the first incoming packet, based solely on the control flag of the first incoming packet when the target connection of the first incoming packet is different from the immediate previous connection.

3. The network monitoring apparatus according to claim 1, wherein the state detection circuit includes: a connection storage circuit configured to store the target connection of the first incoming packet and a state storage circuit configured to store the post-transitional state, and in detecting a state of a target connection to which a new incoming packet belongs, the state detection circuit uses a connection stored in the connection storage circuit as the immediate previous connection and uses a post-transitional state stored in the state storage circuit as the pre-transitional state.

4. The network monitoring apparatus according to claim 1, wherein:
the processing circuit further includes a connection identification circuit configured to prepare rules made up of part or all of an identifier identifying a connection to be monitored, and identify a rule that matches the identifier identifying the connection to be monitored as the target connection of the first incoming packet; and
the connection counting circuit is configured to increment or decrement a connection count for the target connection of the first incoming packet identified by the connection identification circuit only when the post-transitional state indicates the start or end of the target connection of the first incoming packet.

5. The network monitoring apparatus according to claim 4, wherein the connection counting circuit counts control flags by flag type only when the post-transitional state indicates the start or end of the target connection and calculates a number of target connections from counting results produced by counting the control flags by flag type.

6. The network monitoring apparatus according to claim 4, wherein:
the state detection circuit maintains a state table that stores a reference value and a state of the connection to be monitored at an address corresponding to the connection to be monitored, calculates a hash value from the identifier identifying the connection to be monitored, divides the hash value into a first hash value and a second hash value, and acquires the reference value and the state from the state table using the first hash value as an address;
when the second hash value matches the reference value, the state detection circuit determines that the target connection of the first incoming packet is identical with the immediate previous connection and detects the post-transitional state of the target connection of the first incoming packet after the state transition effected by the control flag of the first incoming packet, based on the control flag of the first incoming packet and on the pre-transitional state of the target connection, which is the state acquired from the state table; and
when the second hash value does not match the reference value, the state detection circuit determines that the target connection of the first incoming packet is different from the immediate previous connection and detects the post-transitional state of the target connection of the first incoming packet after the state transition effected by the control flag of the first incoming packet, based on the control flag of the first incoming packet.

7. A connection counting method used for a network monitoring apparatus that includes a communications circuit configured to receive incoming packets from a communications network, and a processing circuit configured to count a number of connections established on the communications network based on the incoming packets received by the communications circuit, the method comprising:
a header analysis step in which the processing circuit acquires, from each incoming packet of the incoming packets, an identifier indicating a target connection to which the incoming packet belongs and a control flag for controlling state transitions of connections corresponding to the incoming packet;
a state detection step in which the processing circuit:
compares the target connection of a first incoming packet with an immediate previous connection of a second incoming packet that is detected by the processing circuit immediately prior to the target connection of the first incoming packet; and
detect a post-transitional state of the target connection of the first incoming packet after a state transition effected by the control flag of the first incoming packet, wherein the immediate previous connection is detected based on the identifier of the second incoming packet, and wherein the post-transitional state of the target connection of the first incoming packet is detected based on the control flag of the first incoming packet and on a pre-transitional state of the target connection of the first incoming packet just before receiving the first incoming packet when the target connection of the first incoming packet is identical with the immediate previous connection of the second incoming packet; and
a connection counting step in which the processing circuit increments or decrements the number of connections only when the post-transitional state indicates a start or end of the target connection of the first incoming packet.

8. The connection counting method according to claim 7, wherein the state detection step comprises detecting the post-transitional state of the target connection of the first incoming packet after the state transition effected by the control flag of the first incoming packet, based solely on the control flag of the first incoming packet when the target connection of the first incoming packet is different from the immediate previous connection.

9. The connection counting method according to claim 7, further comprising:
storing the target connection of the first incoming packet in a connection storage circuit; and
storing the post-transitional state of the target connection of the first incoming packet in a state storage circuit, and the method further comprises detecting a state of a target connection to which a new incoming packet belongs in which the processing circuit uses a connection stored in the connection storage circuit as the immediate previous connection and uses a post-transitional state stored in the state storage circuit as the pre-transitional state.

10. The connection counting method according to claim 7, further comprising:
a connection identification step in which the processing circuit prepares rules made up of part or all of an identifier identifying a connection to be monitored, and identify a rule that matches the identifier identifying the connection to be monitored as the target connection of the first incoming packet, wherein the connection counting step further includes incrementing or decrementing a connection count for the target connection of the first incoming packet identified in the connection identification step only when the post-transitional state indicates the start or end of the target connection of the first incoming packet.

11. The connection counting method according to claim 10, wherein the connection counting step further comprises:
counting control flags by flag type only when the post-transitional state indicates the start or end of the target connection of the first incoming packet; and
calculating a number of target connections from counting results produced by counting the control flags by flag type.

12. The connection counting method according to claim 10, wherein:

the state detection step further comprises maintaining a state table that stores a reference value and a state of the connection to be monitored at an address corresponding to the connection to be monitored, calculates a hash value from the identifier identifying the connection to be monitored, divides the hash value into a first hash value and a second hash value, and acquires the reference value and the state from the state table using the first hash value as an address;

when the second hash value matches the reference value, the state detection step comprises determining that the target connection of the first incoming packet is identical with the immediate previous connection and detects the post-transitional state of the target connection after the state transition effected by the control flag of the first incoming packet, based on the control flag of the first incoming packet and on the pre-transitional state of the target connection of the first incoming packet, which is the state acquired from the state table; and when the second hash value does not match the reference value, the state detection step comprises determining that the target connection of the first incoming packet is different from the immediate previous connection and detects the post-transitional state of the target connection of the first incoming packet after the state transition effected by the control flag of the first incoming packet, based on the control flag of the first incoming packet.

* * * * *